United States Patent
Basso et al.

(10) Patent No.: US 7,929,438 B2
(45) Date of Patent: Apr. 19, 2011

(54) SCHEDULER PIPELINE DESIGN FOR HIERARCHICAL LINK SHARING

(75) Inventors: Claude Basso, Raleigh, NC (US); Jean L. Calvignac, Cary, NC (US); Chih-jen Chang, Apex, NC (US); Gordon T. Davis, Chapel Hill, NC (US); Fabrice J. Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/175,479

(22) Filed: Jul. 18, 2008

(65) Prior Publication Data
US 2008/0298372 A1    Dec. 4, 2008

Related U.S. Application Data

(63) Continuation of application No. 10/772,737, filed on Feb. 5, 2004, now Pat. No. 7,457,241.

(51) Int. Cl.
*H04J 1/16* (2006.01)

(52) U.S. Cl. ............... 370/230; 370/235; 370/412

(58) Field of Classification Search .......... 370/230, 370/235, 236, 351, 392, 394, 412, 413, 474, 370/419, 395.42, 400, 410; 709/240, 250, 709/232, 249; 711/133, 152, 131; 710/52, 710/113, 119, 107
See application file for complete search history.

(56) References Cited

U.S. PATENT DOCUMENTS

| | | | |
|---|---|---|---|
| 5,835,745 A | 11/1998 | Sager et al. | |
| 5,845,072 A | 12/1998 | Finney et al. | |
| 6,031,822 A | 2/2000 | Wallmeier | |
| 6,092,180 A | 7/2000 | Anderson et al. | |
| 6,115,768 A * | 9/2000 | Yamamoto | 710/107 |
| 6,131,140 A * | 10/2000 | Rodgers et al. | 711/104 |
| 6,167,487 A * | 12/2000 | Camacho et al. | 711/131 |
| 6,330,584 B1 | 12/2001 | Joffe et al. | |
| 6,400,715 B1 * | 6/2002 | Beaudoin et al. | 370/392 |

(Continued)

FOREIGN PATENT DOCUMENTS

| JP | 11203145 A | 7/1999 |
|---|---|---|
| JP | 20022334126 A | 11/2002 |

OTHER PUBLICATIONS

IBM Technical Disclosure Bulletin, vol. 36, No. 12, "Compute-Send-Receive -> Sequence Processing within the Multisequencing in a Single Instruction Stream Scheduler", Dec. 1993, pp. 3-8.

(Continued)

*Primary Examiner* — Aung S Moe
*Assistant Examiner* — Abdullah Riyami
(74) *Attorney, Agent, or Firm* — Patrick J. Daugherty; Driggs, Hogg, Daugherty & Del Zoppo Co., LPA

(57) ABSTRACT

A pipeline configuration is described for use in network traffic management for the hardware scheduling of events arranged in a hierarchical linkage. The configuration reduces costs by minimizing the use of external SRAM memory devices. This results in some external memory devices being shared by different types of control blocks, such as flow queue control blocks, frame control blocks and hierarchy control blocks. Both SRAM and DRAM memory devices are used, depending on the content of the control block (Read-Modify-Write or 'read' only) at enqueue and dequeue, or Read-Modify-Write solely at dequeue. The scheduler utilizes time-based calendars and weighted fair queueing calendars in the egress calendar design. Control blocks that are accessed infrequently are stored in DRAM memory while those accessed frequently are stored in SRAM.

12 Claims, 9 Drawing Sheets

U.S. PATENT DOCUMENTS

| | | | |
|---|---|---|---|
| 6,437,789 B1 * | 8/2002 | Tidwell et al. | 345/557 |
| 6,526,060 B1 | 2/2003 | Hughers et al. | |
| 6,657,962 B1 | 12/2003 | Barri et al. | |
| 6,714,553 B1 * | 3/2004 | Poole et al. | 370/412 |
| 6,922,732 B2 * | 7/2005 | Elmaliach et al. | 709/240 |
| 6,952,424 B1 | 10/2005 | Bass et al. | |
| 7,124,205 B2 * | 10/2006 | Craft et al. | 709/250 |
| 7,236,489 B1 * | 6/2007 | Wyatt | 370/392 |
| 7,251,219 B2 * | 7/2007 | Lakshmanamurthy et al. | 370/236 |
| 7,277,990 B2 * | 10/2007 | Jain et al. | 711/133 |
| 2001/0049711 A1 | 12/2001 | Nishihara | |
| 2002/0023168 A1 * | 2/2002 | Bass et al. | 709/232 |
| 2002/0093964 A1 * | 7/2002 | Yik et al. | 370/400 |
| 2002/0099855 A1 * | 7/2002 | Bass et al. | 709/249 |
| 2002/0167957 A1 | 11/2002 | Brandt et al. | |
| 2003/0046414 A1 | 3/2003 | Pettyjohn et al. | |
| 2003/0081612 A1 | 5/2003 | Goetzinger et al. | |
| 2003/0154328 A1 * | 8/2003 | Henderson et al. | 710/1 |
| 2003/0174650 A1 * | 9/2003 | Shankar et al. | 370/235 |
| 2004/0004964 A1 * | 1/2004 | Lakshmanamurthy et al. | 370/394 |
| 2005/0094881 A1 * | 5/2005 | Takagi | 382/232 |
| 2005/0129020 A1 * | 6/2005 | Doyle et al. | 370/392 |
| 2005/0152374 A1 | 7/2005 | Cohen et al. | |
| 2005/0157735 A1 | 7/2005 | Kan et al. | |

OTHER PUBLICATIONS

INSPEC—(Chatha et al; 1998)—two articles; (Wakabayashi et al; 1992); Chatha et al; 2001) Dave et al; 1998/1997)—two articles, 7 pages.

"Efficient Longest Executable Path Search for Programs with Complex Flows and Pipeline Effects", Stappert et al, 2001, pp. 132-140.

"SCED: A Generalized Scheduling Policy for Guaranteeing Quality-of-Service", Sariowan et al, IEEE/ACM Transactions on Networking, vol. 7, No. 5, Oct. 1999, pp. 669-684.

"RECOD: A Retiming Heuristic to Optimize Resource and Memory Utilization in HW/SW Codesigns", Chatha et al, Proceedings of the Sixth International Workshop on Hardware / Software Codesign, IEEE Computer Society et al, Mar. 15-18, 1998, pp. 139-143.

"MAGELLAN: Multiway Hardware-Software Partitioning and Scheduling for Latency Minimization of Hierarchical Control-Dataflow Task Graphs", Chatha et al, Proceedings of the Ninth International Symposium on Hardware/Software Codesign, ACM SIGDA et al, Apr. 25-27, 2001, pp. 42-47.

"COHRA: Hardware-Software Co-Synthesis of Hierarchical Distributed Embedded System Architectures", Dave et al, Proceedings of the Eleventh International Conference on VLSI Design, VLSI Society of India, Jan. 4-7, 1998, pp. 347-354.

"A Synthesis Algorithm for Pipelined Data Paths with Conditional Module Sharing", Wakabayashi et al, 1992 IEEE International Symposium on Circuits and Systems, vol. 2 of 6, IEEE, May 10-13, 1992, pp. 677-680.

"COHRA: Hardware-Software Cosynthesis of Hierarchical Heterogeneous Distributed Embedded Systems", Dave et al, IEEE Transactions on Computer-Aided Design of Integrated Circuits and Systems, vol. 17, No. 10, Oct. 1998, pp. 900-919.

* cited by examiner

Fig. 6

SCHEDULER PIPELINE DESIGN FOR HIERARCHICAL LINK SHARING

CROSS-REFERENCE TO RELATED APPLICATION

This application is a continuation of U.S. application Ser. No. 10/772,737, filed Feb. 5, 2004.

FIELD OF THE INVENTION

The present invention relates to the requirement of minimizing the number of external memory devices that are required by a hardware schedule for hierarchical link sharing.

BACKGROUND OF THE INVENTION

Network traffic management requires hardware implementation for scheduling the delivery of network packets, and for traffic shaping. For this, a computer employs a scheduler which is a computer program designed to perform functions, such as network packet scheduling, traffic shaping, and initiation and termination of specified tasks. Hardware schedulers utilize external SRAM and DRAM memory devices to store control blocks of scheduling elements. Because of the expense of external SRAM memory devices, an important consideration is to reduce the number of such devices to better control costs of manufacture. However, it is still necessary to be able to quickly and accurately execute searches for programs with complex flow patterns.

A number of features are found in related art devices, but none of these devices embody the combination of features that are found in the present invention. For example, U.S. Pat. No. 6,330,584 B1 discloses systems and methods for multitasking, resource sharing and execution of computer instructions. The task of scheduling is performed by a hardware scheduler requiring no operating system. Simple techniques are provided to synchronize shared resource access between different tasks in a multi-tasking, pipelined processor. Consecutive instructions are executed by different tasks, thereby eliminating the need to purge an instruction execution pipeline of subsequent instructions when a previous instruction cannot be completed. The systems implement external memory and control areas to accommodate the scheduling elements.

U.S. Pat. No. 6,092,180 discloses a method for scheduling instructions in a pipelined environment. Pipeline latencies and resource utilization are measured by sampling hardware while the instructions are executing.

U.S. Pat. No. 5,845,072 discloses a method for parallel and pipelining transference of data between integrated circuits using a common macro interface. The method uses standard hardware design language.

US Patent Application Publication 2001/0049711 A1 discloses a pipeline processing type of shaping method in which strict shaping processing can be implemented for a connection at varied speed by adding a circuit configuration.

U.S. Pat. No. 5,835,745 discloses a hardware instruction scheduler for short execution unit latencies. The scheduler also includes a pattern of past histories.

Other non-patented sources disclose hardware schedulers and instruction processing; pipelined schedules with hardware-software codeszigns and/or synthetic algorithm for pipelined data paths with conditional module sharing/resource sharing; or hardware-software co-synthesis of hierarchical distributed embedded system architectures.

At very high data flow rates, e.g. 10 Gbps design point, hardware scheduler implementation typically stores all functional queue control block content in external SRAM devices to meet media speed performance requirements. There are at least three problems associated with this approach.

First, SRAM devices usually are associated with higher cost compared to DRAM devices, thus increasing system design cost. Second, SRAM devices are more limited in terms of capacity compared to DRAM devices. Third, scheduling functions are becoming complex, thereby requiring: (a) a large number of functional queue control blocks, and (b) large size control blocks to store the required information. For example implementation from Azanda Networks (one of the better scheduler implements currently known in the industry) only uses SRAM devices to cope with the functional requirements.

A goal of scheduler design is to be technology independent. For high data transfer rates, the scheduler architecture shall be an open architecture such that the scheduler can be part of the PowerNP software offering if the network processor has enough processing power to perform the scheduler function in addition to the packet forwarding functions.

The design of the scheduler in ingress configuration provides per flow queuing for switching. In the egress configuration, the scheduler provides per flow queuing, traffic shaping, and scheduling functions. The scheduler design is based on a work conserving concept such that the scheduler shall always work on a frame, i.e., there is no working cycle spent with no frame being dequeued.

A scheduler includes the following components:
  Flow Queues: Frames are enqueued in a flow queue by the NPC (network processor complex). A flow queue is attached to one or two Schedule Control Blocks (SCBs).
  An SCB is an object that is subject to scheduling by the scheduler. Each SCB has exactly one flow queue associated with it. Once an SCB is selected by the scheduler, a frame from the corresponding flow queue is moved to the appropriate target port queue and the SCB will be reconnected to the scheduler.
  Target Port Queues (TPQ) with associated Queue Control Block (QCB): Acts as an elastic queue. All frames in the TPQ will be transmitted onto the port.
  Hierarchy Control Blocks (HCBs): Behaves like a TP queue at each hierarchy level. All frames belonging to the queue will be transmitted to the next level of aggregated hierarchy queue till the TPQ has been reached.

In addition to the components described above, a scheduler contains the following scheduling units:
  Circular Calendar: This is a non-work conserving calendar that provides guaranteed bandwidth service by scheduling according to absolute time and the length of each frame. This is an entity shared by all the flow queues.
  Square Calendar: This is a work-conserving calendar that schedules frames based on Weighted Fair Queueing (WFQ) mechanism among the queues attached to the calendar. The square calendar will be selected when the circular calendar has nothing for the clock tick.
  Triangular Calendar: This is a non-work conserving calendar and is actually a purgatory that is used to regulate the traffic of a queue attached according to absolute time. When a queue or hierarchy control block has been attached to the purgatory, the queue or hierarchy control block is temporarily disabled and cannot transmit frames until it has been removed from the purgatory and attached to the scheduling calendars.

SUMMARY OF THE INVENTION

The present invention relates to the storage of functional queue control blocks in a mix of SRAM and DRAM devices.

This is achieved by storing control block content that is Read-Modify-Write at both packet enqueue and dequeue time in SRAM devices. Control block content that is Read-Modify-Write at only packet dequeue time is stored in either SRAM or DRAM devices with DRAM storage being preferable. Control block content that is Read only either at enqueue or dequeue time is stored in DRAM devices. By arranging the flow queue control blocks in this manner, the number of SRAM devices that must be used, and their associated drawbacks, is reduced.

The invention also relates to a pipeline arrangement for a network traffic scheduler. The pipeline comprises a hierarchical structure, a plurality of SRAM and DRAM memory devices external to the scheduler, and control blocks of scheduling elements stored in said memory devices with at least some of the memory devices storing more than one type of control block. The SRAM memory is used if the content of a control block is Read-Modify-Write at packet enqueue and at dequeue. The SRAM and DRAM memory are used, with the DRAM being preferred, if the control block content is Read-Modify-Write only, at the packet dequeue. The DRAM memory is used if the control block content is 'read' only at packet enqueue and dequeue. The control blocks include flow queue control blocks, frame control flow blocks, hierarchy control blocks, target port queue control blocks, and schedule control blocks. The hierarchical structure comprises a physical port bandwidth that is divided into a plurality of logical links, the bandwidth available to each of the logical links is divided into a plurality of VLANs, and the bandwidth associated with each VLAN is shared by a plurality of individual user flows. The pipeline also includes non-hierarchical link sharing whereby physical port bandwidth resources are shared among individual traffic flows.

The memory access to enqueue tasks does not conflict with memory access allocated to dequeue tasks. A first SRAM contains a set of data buses and stores flow queue control blocks that are required for 'read' and 'write' at each flow queue enqueue and dequeue time, and a second SRAM containing two data buses, one dedicated to 'read' and one dedicated to 'write', and stores frame control blocks and VLAN hierarchy control blocks. Preferably, a first DRAM stores a network management counter and a second DRAM stores flow queue control blocks and VLAN hierarchy control blocks that require 'read' only at both enqueue time and dequeue time.

The present invention also relates to a method for retrieving and pipelining information for a network traffic scheduler, wherein the information is stored in a plurality of SRAM and DRAM devices. Functional queue control blocks are stored in the SRAM and DRAM devices wherein control block content that is Read-Modify-Write at both packet enqueue and dequeue time is stored in SRAM devices. Control block content that is Read-Modify-Write packet only at dequeue time is stored in either SRAM or DRAM devices. Lastly, control block content that is read only either at enqueue or dequeue time is stored in DRAM devices. The information is in two modes, hierarchical link sharing and non-hierarchical link sharing. The structure for hierarchical sharing comprises a physical port bandwidth which is divided into a plurality of logical links. The bandwidth available to each of the logical links is divided into a plurality of VLANs, and the bandwidth associated with each VLAN is shared by a plurality of individual user flows. The physical port bandwidth resources for non-hierarchical links are shared among individual traffic flows.

Further, the invention relates to a structure for a hardware scheduler pipeline. The structure comprises a plurality of different types of packet control blocks, such as flow queue control blocks, frame control blocks, calendar control blocks and hierarchy control blocks. A plurality of memory devices are located external to the scheduler in which the control blocks are stored. At least some of the memory devices share more than one type of control block. The structure also has a hierarchical pipeline arrangement for link resource sharing serving multiple queues. The sharing serves the multiple queues within an approximated fixed period of time; however, the approximated fixed period of time need not be exactly proportional to the shares of resources. Control blocks that are accessed less frequently within a fixed period of time generally are stored in DRAM memories, and control blocks that are accessed with higher frequency within a fixed period of time are stored in SRAM. The structure includes time-based calendar arrays for guaranteed bandwidth service for flow queues and VLANs, and weighted fair queueing calendar arrays for allocation of available bandwidth for competing flows at each port when no service is required by the time-based calendars. This calendar is available for flow queues, VLANs and logical links.

The invention further relates to an article of manufacture comprising a computer usable medium having a computer readable program embodied in said medium, wherein the computer readable program, when executed on a computer, causes a scheduler to store functional queue control blocks in external memory storage devices comprising a mix of SRAM and DRAM devices based on the block content at enqueue and dequeue time, and to share the external devices among the control blocks. The program causes a control block content having Read-Modify-Write at both enqueue and dequeue time to be stored in SRAM; a control block content having Read-Modify-Write at only dequeue time to be stored in either SRAM or DRAM; and a control block content having Read only to be stored in DRAM. The program also causes the scheduler to select a flow queue to egress for each duration of a scheduler tick using a time-based calendar or a weighted fair queueing calendar.

BRIEF DESCRIPTION OF THE DRAWINGS

FIG. 6 shows a pipeline design for guaranteed rate flow queue dequeue processes;

DETAILED DESCRIPTION OF THE INVENTION

Glossary of Terms and Abbreviations

The following terms and abbreviations shall have the meanings as set forth below unless clearly contra-indicated elsewhere in the body of the specification.

Figure 1:
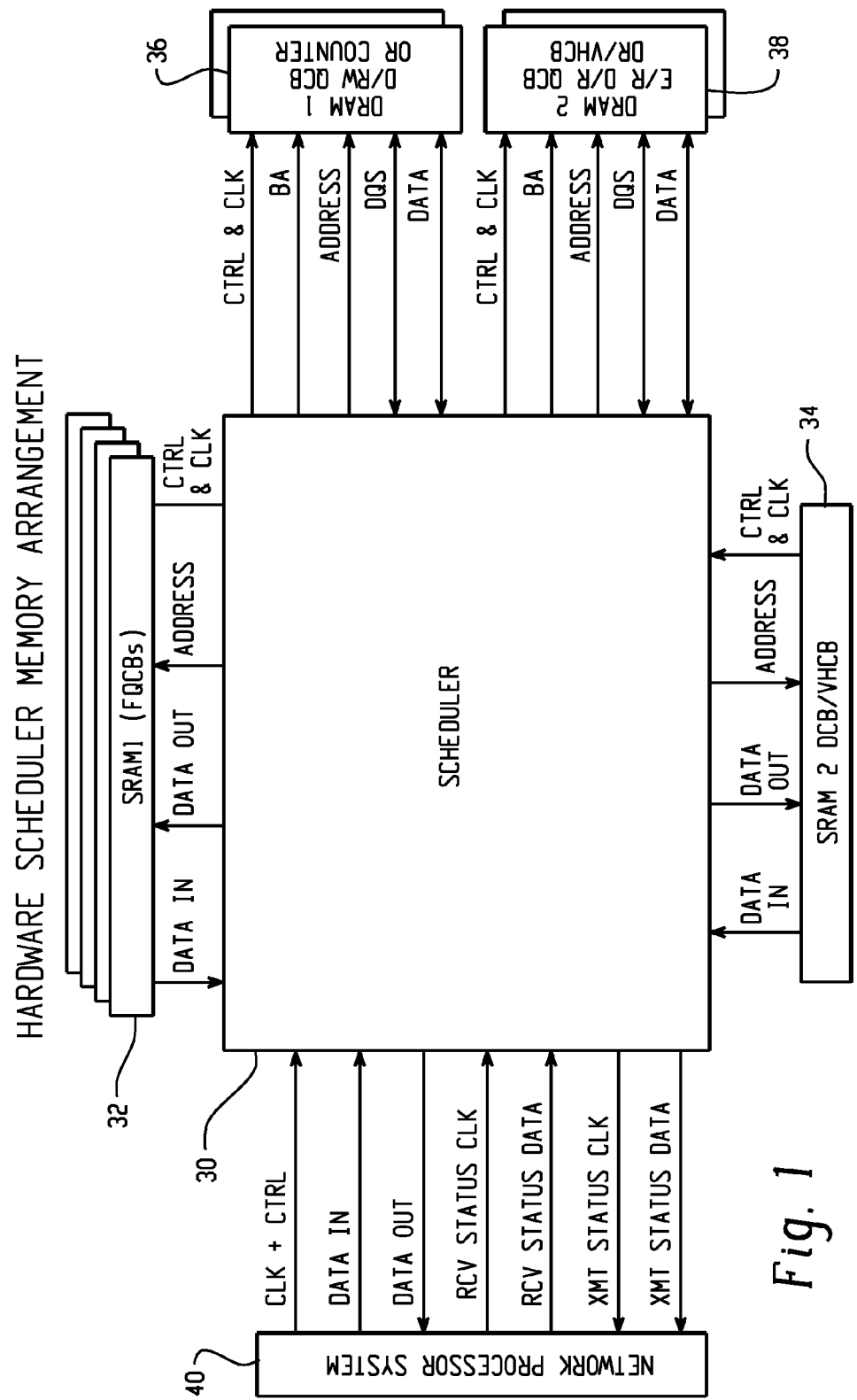
FIG. 1 shows a scheduler with external interfaces for a network processor system.

BCB buffer control block
CCB calendar control block
CSD circular service distance
DRAM dynamic random access memory
EFS expedited forwarding service
FCB frame control block FCBA FCB address
FQCB flow queue control block
Gbps gigabit per second
HCB hierarchy control block
LHCB logical-link hierarchy control block
LIFO Last In First Out
LLS low latency sustainable service
NLS normal latency sustainable service
NPC network processor complex
NPF-SI network processor forum streaming interface
PHCB port hierarchy control block
PRI priority
PSR peak service rate
QCB queue control block
QoS quality of services
SCB scheduler control block
SD service distance
SRAM static random access memory
SSD square service distance
SSR sustainable service rate
TDM time division multiplexing
TH threshold
TOS type of service
TP target port
TPQ target port queue
TPQCB target port queue control block
VHCB VLAN hierarchy control block
VLAN virtual local area network
WFQ weighted fair queueing The typical function placement of the scheduler is illustrated in FIG. 1. The scheduler may be considered as an optional device for simple network processor systems inasmuch as the network processor system provides minimum scheduling functions on a per-port basis. However, for advanced scheduling algorithms such as those discussed herein, the scheduler device is essential for the speed and efficiency of the system.

The present invention will be described for a network processor scheduler chip that supports 10 Gbps data rates, it being understood, of course, that systems having data rates greater or less than this can likewise benefit from the invention. The scheduler performs scheduling of schedulable flows based on several quality of service (QoS) parameters. For 10 Gbps rates, the internal scheduler logic runs at 166 MHz. After flow initialization, the module schedules a frame every 36 nSec clock cycles. The scheduler receives frame information from the network processor system chip via the NPF compliant interface. To provide sufficient memory access bandwidth, two types of memories are used. Static Random Access Memory (SRAM) and Dynamic Random Access Memory (DRAM) are used for network management counters, part of flow queue control block (FQCB) and part of VLAN (virtual local area network) hierarchy control blocks (VHCBs) memory. Frame Control Blocks (FCBs), as well as some VHCBs, are stored in another SRAM memory.

A detailed diagram of the external interfaces of the scheduler is shown in FIG. 1. There are two SRAM interfaces 32, 34. SRAM 1 (32), contains a set of data buses, one dedicated for 'read' access, and one dedicated to 'write' access, and is required to store parts of FQCBs, that are required to be read and written at each flow queue enqueue and dequeue instance. SRAM 2 (34) contains two data buses; one dedicated to 'read' access and the other dedicated to 'write' access, and is required to store FCBs and VLAN HCBs. In addition to the two sets of SRAM memory, two sets of DRAM memories 36, 38 are used to store parts of FQCBs and VHCBs. DRAM 1 (36) is used to store the network management counter while DRAM 2 (38) is used to store parts of FQCBs and VHCBs that require to be read only at both enqueue and dequeue time. A chip 40 handles data flow to and from the scheduler 30 and includes data in and out, status data and status checks in and out as well as clock and control.

Figure 2:
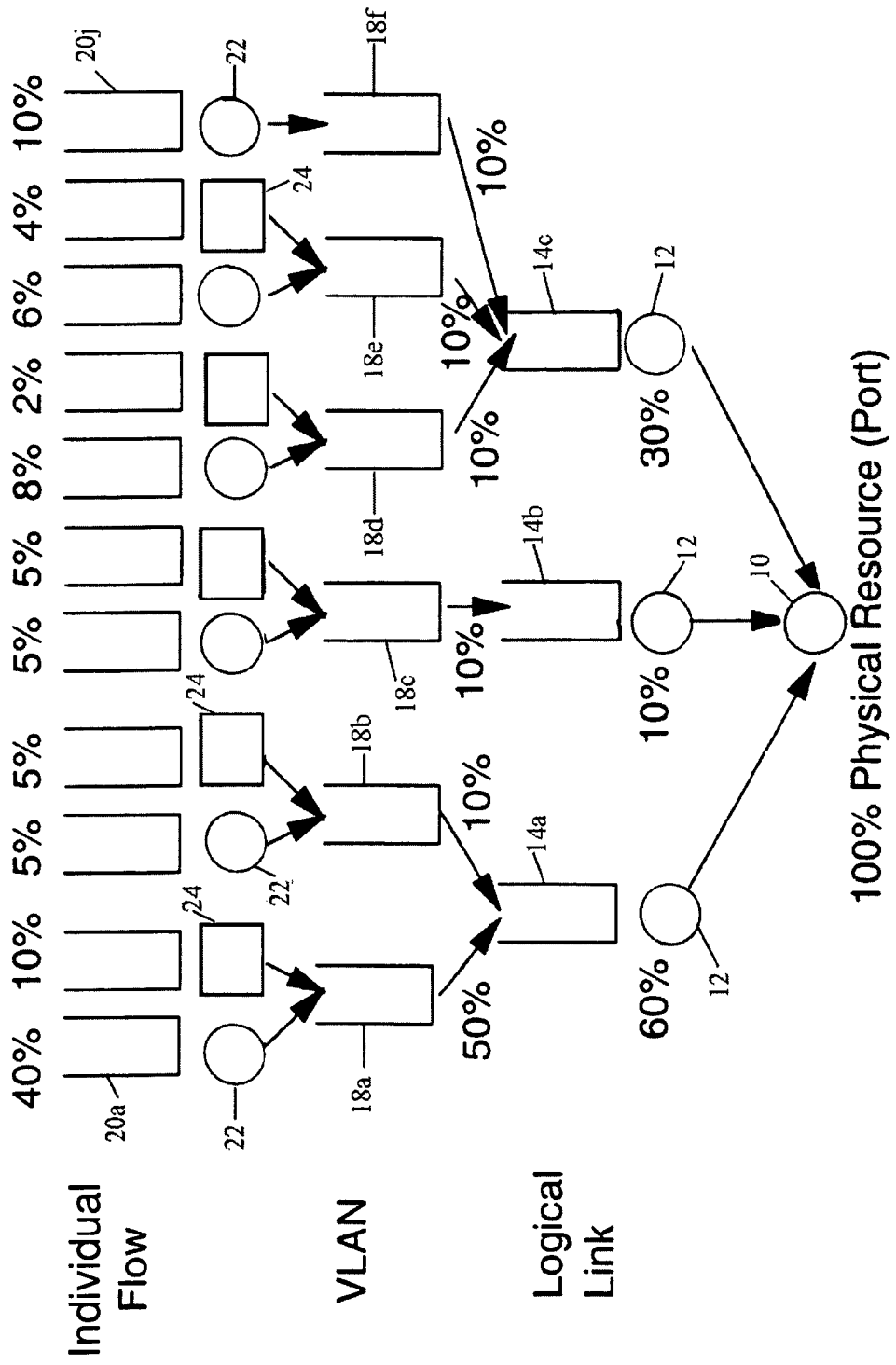
FIG. 2 shows a scheme for hierarchical link resource sharing.

The scheduler design in the egress configuration shall support two modes: non-hierarchical link sharing and hierarchical link sharing. Basically, the difference between these two types of schedulers is the structure of link resource sharing. In non-hierarchical link sharing, physical port bandwidth resources are shared among individual traffic. The logical view of the flow queue in the hierarchical link sharing scheduler is shown in FIG. 2 wherein the flows depend on the flow queue parameters of the individual flows. The bandwidth of the physical port 10 is divided into several logical links 12 serving queues 14a-14c. The bandwidth available to each of the logical links can be further divided among several VLANs, with six queues being shown as queues 18a-18f. The bandwidth associated with each VLAN is shared by many individual user flows forming flow queues 20a-20j. The hierarchical link sharing shall either be static (permanently assigned by the network administrator) or dynamic (varying in response to the current condition on the network). The hierarchical link sharing enables controlling resource sharing among services and supporting different customers' needs in the same infrastructure. The links are either circular (22) or square (24). The circular links represent guaranteed data flow and the square links correspond to the best effort flow of data.

A practical application of the flow shown in FIG. 2 can be represented by picturing the logical links 12 as multiple clients, companies or the like. The VLANs might represent different geographical or virtual sites for the companies. Then the individual flows could represent discrete products or services, or other data representing a facet of the operation at the different sites. Obviously, the three levels of logical links, VLANs and individual flows could be programmed to represent many different aspects of the operation of a company or a client. With this scenario, the physical port can be pictured as a parent with the logical link being a child of the port, the VLAN being a child of the logical link and the individual flow being a child of the VLAN.

The scheduler provides shaping functions in the network processor system. The scheduler manages bandwidth on a per frame basis by determining the bandwidth a frame requires (that is, the number of bytes to be transmitted within a given period of time) and comparing this against the bandwidth permitted by the configuration of the frame's flow queue. The bandwidth used by the first frame affects when the scheduler permits the transmission of the second frame of a flow queue. It is noted that the low-latency sustainable bandwidth service (LLS) is an implementation option and is not a requirement.

Different from the flow queues, the VLANs and logical links are characterized with the peak service rate (PSR) and weights in the scheduler. It is noted that Expedited Forwarding Service (EFS) can also be included as part of the best effort service such that the flow queue associated with the EFS has absolute priority over other flow queues associated with the Best Effort Service in the same VLAN.

In one embodiment based on a 10 Gbps data rate, the scheduler consumes 36 nSec per frame, which is shared among all the physical ports being served by the scheduler. That is, the scheduler shall be able to enqueue and dequeue a frame in 36 ns, which is equivalent to six clock cycles of the scheduler. The SSR (Sustainable Service Rate) and PSR (Peak Service Rate) parameters of a flow queue, VLAN, and logical link are specified according to the following rules:

The reciprocal value of the rate is specified. This will be called SD (Service Distance). That is, instead of specifying N bits/sec, the duration between bits is specified, such as T sec/bit.

SSR is specified as CSD (Circular Service Distance) and PSR is specified as SSD (Square Service Distance).

When CSD of a flow queue equals 0, the flow queue does not receive any guaranteed bandwidth.

When SSD of a flow queue equals 0, the flow queue is not subject to peak rate limitations.

The unit of SD is (36/45) nSec/8-bits.

The calendar scheduler shall calculate the "distance" according to:

$$Distance = SD * Frame\_Length(in\ bytes)/45.$$

The weight parameter of a flow queue is specified and used by the scheduler according to the following rules:

The weight is specified. This will be called Square Weight (SWeight).

When SWeight=0, the Weight parameter is ignored.

The unit of measurement for the frame length for the Weighted Fair Queue (WFQ) algorithm is 45 bytes.

Of course, it should be understood that other embodiments are contemplated as likewise coming within the scope of the claimed invention.

Figure 3:
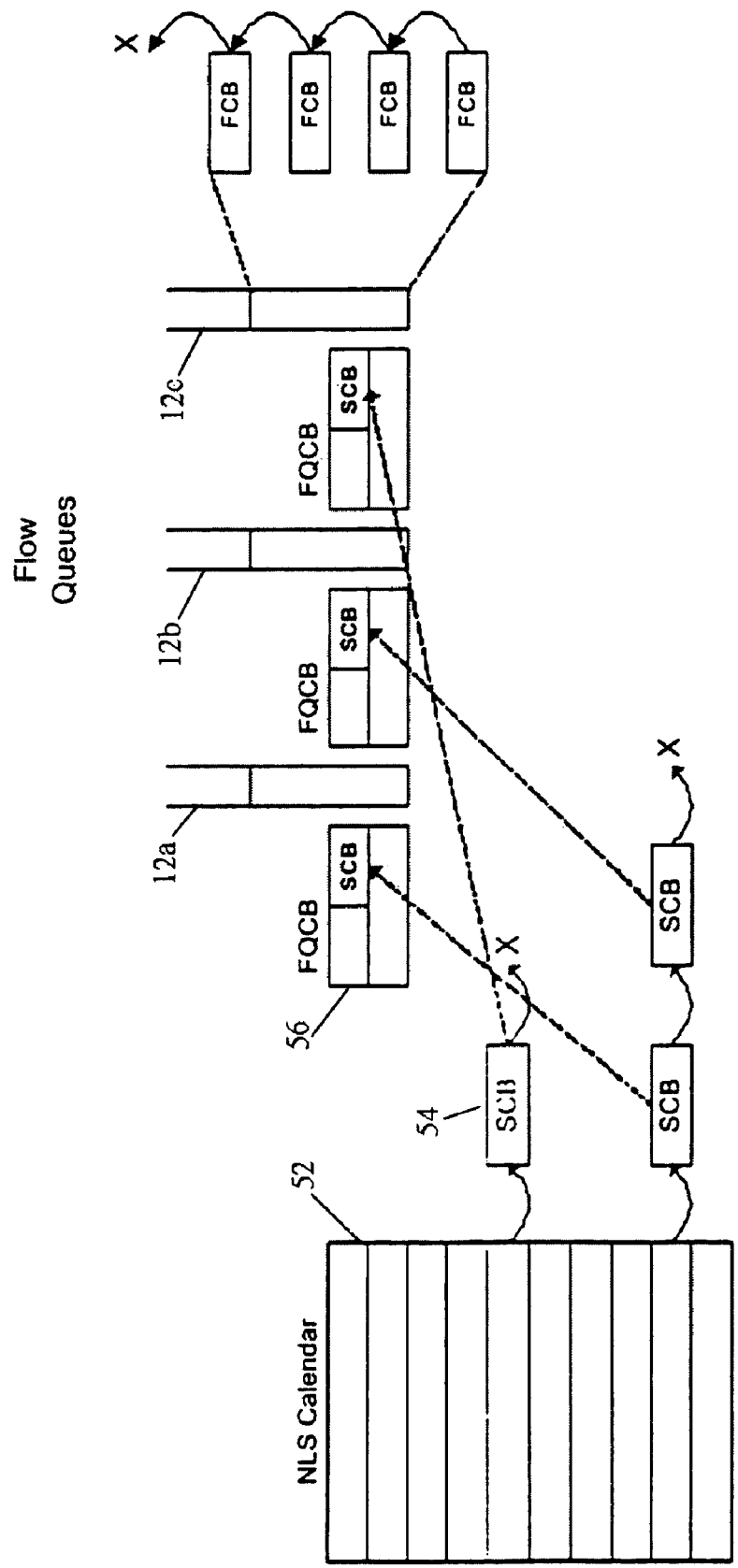
FIG. 3 shows the scheduler components.

The scheduler components are shown in FIG. 3 and include flow queues, SCBs, TPQs and HCBs. The scheduling units contain circular calendars, square calendars, and triangular calendars. Basically, each entry in the NLS calendar 52 represents a clock tick in the case of the circular calendar and shall contain a scheduler control block (SCB) 54 associated with a flow queue 14a-14c. The flow queues that are scheduled to be transmitted at the same clock tick will then form a Last In First Out (LIFO) linked list of SCBs to resolve the collision at the same clock tick. Each SCB is used to associate with a particular flow queue. Each flow queue then contains a linked list of frames to be transmitted. It is noted that the last SCB in the LIFO chain shall point to a predetermined value.

A flow queue is represented by flow queue control block (FQCB) 56 that contains information about a single flow, as well as information that must be configured before the flow QCB can be used. It is preferred that each flow queue is associated with the following parameters:

HCB address—used to indicate the next hierarchy level of physical or logical link to which a flow belongs.

Sustainable Service Rate (SSR)—defined as the minimum guaranteed bandwidth provided to the flow queue. It is implemented using the circular calendars.

Queue weight for best effort service—the queue weight is used to distribute available bandwidth among queues assigned to a logical connection or a port. The available bandwidth of a logical connection or a port is distributed among contending queues in proportion to the weight of the flow queue.

Peak Service Bandwidth—defined as the additional bandwidth that a flow queue is allowed to use; in other words, the difference between the guaranteed bandwidth and the peak bandwidth.

Transmit Probability—flow control uses the transmit probability field. The flow control algorithms update this field periodically.

The logical presentation of a flow queue is a linked list of frames. Each frame in the scheduler is associated with a frame control block (FCB) 44, which is a subset of the FCB in the network processor system. The FCBs are located in SRAM 2 memory.

The Flow QCB shall contain two portions: The first part is essential for scheduler enqueue and dequeue operation (basic flow QCB) that requires to be read and written at each enqueue and dequeue instance. The second part is only related to scheduler dequeue operation (Dequeue Flow QCB) that requires to be read and written at each dequeue instance. The second part is related to both enqueue and dequeue operation and is only required to be read at either enqueue or dequeue instance. The basic flow QCB shall be stored in SRAM memory and the dequeue/enqueue read-only flow QCB is stored in the DRAM 2 memory.

Hierarchy Control Block

The Hierarchy Control Block (HCB) represents the link-sharing queue structure at each hierarchy level. In theory, there shall be no limitation on the number of hierarchy levels a scheduler can have. However, considering the practical network applications, four hierarchy levels shall be able to provide reasonable link-sharing granularities. These four levels are: flows, virtual local area networks (VLANs), logical links, and ports. The representation of a four-level link-sharing structure is shown as one embodiment in FIG. 2. The percentages shown therein are the relative bandwidth portions of the physical port distributed to the individual queues and are for illustration purposes only.

Each VLAN logical link as well as port is associated with a control block for link sharing management purposes. The VLAN HCB (VHCB) contains two parts: One part requires read-write access at each enqueue and dequeue instance and is stored in the SRAM 2 memory. Another part requires read-only access at each dequeue instance and is stored in DRAM 2 memory.

It is noted that the three calendar control blocks (CCBs) in the VHCB can be rotated at the dequeue time such that CCB1 will always be the first entry of most recent active square calendar entry such that a flow queue can be inserted to the square calendar when enqueueing a frame to an empty queue with minimum memory bandwidth requirements. In this case, the enqueue operation only requires accessing to the first word of the VHCB. However, the dequeue operation will always require accessing to all three words of the VHCB.

Target Port Queue Control Block

The target port queue control block (TPQCB) is used to represent the linked list of frames in the target port queue (TPQ). The TPQCB shall be stored in the on-chip memory of the network processor system chip and the content of the TPQCB will not be further described herein. The dequeue of a frame from a TPQ is based on a round-robin fashion. In addition, the insertion and deletion of a TPQ from this round-robin shall be complemented by the status of the TPQ such that the dequeue from the TPQ can be work conserving. Typically, the status of the TPQ is explained as follows:

TPQ Pressure—This indicates whether there are any frames in the TPQ. Upon dequeue of the TPQ, if there is no frame in the TPQ, the TPQCB will be removed from the round-robin. If enqueue to an empty TPQ, the TPQCB will be re-inserted into the round-robin. Each TPQ shall have an associated bit to indicate the TPQ pressure and shall be stored in the network processor system chip.

Dequeue Back Pressure—This is used to indicate if the threshold of the TPQ has been exceeded such that the dequeue of frames from the flow queue can be halted until the TPQ is not congested. At enqueue time, if the threshold of the TPQ has been exceeded, the TPQCB will be removed from the round-robin. On the other hand, if the dequeue of TPQ has made the queue depth smaller than the threshold, the TPQCB will be reconnected to the round-robin. Each of the TPQs shall have an associated bit to indicate if the threshold of the TPQ has been exceeded and shall be stored in the scheduler chip.

Logical Link Pressure—This is used to indicate if any of the logical links in this physical port have frames to be transmitted. If there is no other logical link connecting to the physical port, the TPQCB will be disconnected from the round-robin after the last frame in the TPQ has been dequeued. On the other hand, if this is the first logical link connecting to the physical port calendar, the TPQCB will be connected to the round-robin when the first frame has been enqueued to the TPQ. Each TPQ shall have an associated bit to indicate the pressure from the logical link and shall be stored in the scheduler chip.

Scheduling Units

The egress scheduler selects a flow queue to service every scheduler 'tick'. The duration of a scheduler 'tick' shall be configured depending on the requirements of the system. There are two types of scheduling calendars used in the egress calendar design; time-based and weighted fair queuing (WFQ).

Time-based calendars—The time-based calendars are used for guaranteed service (LLS & NLS) and for rate limit purgatory.

Weighted fair queuing calendars—The WFQ calendars allocate available bandwidth to competing flows on a per-port basis. Available bandwidth is the bandwidth left over after the flows in the time-based calendars get their bandwidth. A WFQ calendar is selected for service only when no service is required by the time-based calendars and the target port queue does not exceed a programmable threshold. The use of this threshold is the method that assures the WFQ calendar dequeues frames to the target port at a rate equal to the port's available bandwidth.

Guaranteed Rate Calendar

The guaranteed rate calendar (circular calendar) is used to provide the scheduling function for flow queues or VLANs based on the minimum guaranteed bandwidth parameters of the flow queues. The circular calendars contains two sets of calendars; a low latency sustainable service (LLS) calendar has the higher priority than the normal latency sustainable service (NLS) calendar. The LLS calendar is not a requirement but is an implementation choice. If the PRI bit in the FQCB has been set, this flow queue is connected to the LLS calendar. Preferably, each of the circular calendars is a global resource that consists of four calendar arrays with 512 entries each. The number of calendar planes and number of entries in each plane shall be determined by performance modeling to minimize the collision on the same calendar entry.

All SCBs in the LIFO linked list that start at a CCB wakeup at the same time; that is, the absolute time corresponds to the CCB. The goal of the calendar is to manage the absolute time. For those SCBs that are awake, a dequeue operation on the corresponding flow queue is executed and the corresponding flow queue, VLAN or logical link are placed in the WFQ calendar for services.

Each of the calendar arrays also contain three pointers: Current Position (Current P), Current Time (Current T), and Next Position (Next P). The Current P always points to the CCB that the calendar is currently serving. The Current T pointing to the CCB corresponds to the current absolute time and is updated based on a TDM (Time Division Multiplexing) fashion among all the calendar planes. The next position is pointed to the next non-empty calendar entry between the Current P and Current T pointers such that the scheduler does not have to visit the empty calendar entry as long as there is "work" to be done up to current time.

Rate Limit Purgatory

A rate limit purgatory (triangular calendar) is used to provide the rate limit function for flow queues, VLANs and logical links based on their peak bandwidth parameters. Similar to the circular calendar, the triangular calendar is also a global resource that typically consists of four calendar arrays with 512 entries each.

Weighted Fair Queue Calendars

The weighted fair queuing (WFQ) calendar (square calendar) provides the best effort scheduling function for the flow queues, VLANs and logical links based on the WFQ algorithm according to the "Weight" parameters of the flow queues, VLANs and logical links. The WFQ calendars are associated with the aggregated hierarchy link-sharing structure, that is, VLANs and logical links as well as ports. Each square calendar consists of an array of a fixed number of CCB entries deepening on the granularity of queue weights implemented in the scheduler. The CCBs have exactly the same format as the CCBs in the circular and triangular calendars. The square calendar operates with the lowest priority among the three types of calendar.

It should be noted that if a flow queue, VLAN, or logical link has exceeded its contract peak service rate, the flow queue, VLAN, or logical link will be placed in the triangular calendar and the repetition rate of this flow queue, VLAN, or logical link will be set to zero. When the triangular calendar has inserted this flow queue, VLAN, or logical link back to the square calendar, the repetition rate will be reset to the contract queue weight.

Calendar Control Block

Preferably, the Calendar Control Block (CCB) represents the calendar entry corresponding to each calendar time 'tick' in the scheduling calendar. The content of the CCB is used to indicate the first SCB in the calendar entry. In addition, the CBT field is used to indicate the type of the control block pointed by the FSCB, '00' representing FQCB, '01' representing VHCB, and '10' representing LHCB.

Scheduler Operation

The operation of the scheduler includes enqueueing, dequeueing, mathematical calculation and discarding frames. The enqueue and dequeue of frames are related to scheduling the transmission of frames while the discard of frames is related to flow control.

Enqueue Operation

When the network processor complex (NPC) completes the processing of a frame, the NPC will enqueue the frame to a flow queue through the network processor system. The network processor system provides an enqueue request that includes flow queue ID, the FQB address, the byte count, the frame type (policing), the type of service (TOS) frame, the FCB free queue status and the BCB (buffer control block) free queue status, to the scheduler. Once the scheduler has received the enqueue request, the scheduler determines if the frame can be forwarded to the flow queue based on the threshold of the flow queue that the enqueuing frame is designated. When the frame has been determined to be forwarded or discarded, the scheduler provides an enqueue response message to the network processor system such that the network processor system can perform the relative actions.

When a frame is enqueued in a flow queue, one of the following scenarios may occur:

The flow queue is empty. In this case, the flow queue was not connected to the calendar. This is the case after creation of a flow queue. Once a flow queue becomes non-empty, it will be attached to the scheduler calendar by placing the corresponding SCB of the flow queue to either the circular or square calendar. If a flow queue with a guaranteed service rate element has been inserted to the scheduler calendar, the available bandwidth of the VLAN, logical link and port to which this flow belongs shall be updated.

The flow queue contains exactly one frame, the flow queue is already connected to the circular calendar, and the flow queue BW_C parameter is non-zero. (MSB credit is not exceeded.) The flow queue will now be connected to the square calendar. This is the case after dequeueing a flow queue with two frames that are attached to the square calendar and a new frame has arrived to the flow queue before the last frame in the flow queue has been dequeued, or the case wherein the second frame has been enqueued to the flow queue before the first frame in this queue has been scheduled for transmission.

The flow queue contains two or more frames, and the threshold of the queue has not been exceeded. In this case, nothing special happens except the flow queue control block is updated.

The threshold of the flow queue has been exceeded. A discard probability will be calculated based on the current depth of the flow queue. If the decision is to discard the frame, the network processor system chip will be notified of the discard and the frame will be enqueued to the discard queue in the network processor system. The network management counters that keep track of the discard activities will also be updated accordingly.

Dequeue Operation

Once a flow queue is attached to one or two scheduling units, it is subject to being scheduled by the scheduler. That is, either the circular calendar or the square calendar may select the flow queue. When a flow queue is selected by the calendar, a frame will be dequeued from the flow queue and moved to the corresponding target port queue when the accumulated credit counts are greater or equal to the length of the frame in the head of the flow queue. The frame will actually be transmitted at a later time. One exception is that when a flow queue is being emptied by the circular or square calendar, if the accumulated circuit counts are short by a predetermined number of bytes in comparison with the length of the frame, the frame will be dequeued from the flow queue and moved to the corresponding target port queue. In this case, the next service time field in the FQCB of this flow queue will be updated.

The dequeue operation is triggered by the scheduler selected flow queue, and the calendar selection is determined by the calendar selection algorithm.

Scheduler Scheduling Unit Selection Algorithm

The scheduler unit selection is performed prior to the selection of a flow queue for dequeue operation. The selection of the scheduler unit is made in absolute priority.

Scheduler Flow Queue Selection Algorithms

At every scheduling time of a flow queue, the accumulated counter CREDIT_ACCUM is incremented by a predetermined number of bytes. If the credits are not sufficient in comparison with the length of the frame, the flow queue will be reinserted in a scheduler unit. Otherwise, the frame will be dequeued from the flow queue and, if there are enough frames in the flow queue, the flow queue will be re-inserted in a scheduler unit according to the following rules:

A flow queue that is selected by the circular calendar will be re-inserted in the circular calendar at absolute time.

A flow queue that is selected by the VLAN WFQ square calendar will be re-inserted in the square calendar or in the triangular calendar:

If the peak rate is not exceeded, (and if there is enough MBSCredit), the flow queue will be re-inserted in the square calendar of the belonging VLAN.

If the peak rate is exceeded, (or if there is not enough MBSCredit), the flow queue will be served and then will be inserted in the triangular calendar at absolute time.

A flow queue that is selected by the triangular calendar will be re-inserted in the VLAN square calendar and will be served. There are two scenarios in which the flow queue will be reinserted in the triangular calendar again:

If the VLAN or logical link to which this flow queue belongs is still in the triangular calendar, the flow queue will be served and be re-inserted to the triangular calendar at absolute time given by the next service time associated with the VLAN or logical link plus the newly calculated next service time of the flow queue.

If the next service time of the VLAN or logical link to which this flow queue belongs is greater than the current service time of this flow queue, the flow queue will be served and be re-inserted to the triangular calendar at absolute time given by the next service time associated with the VLAN or logical link, plus the newly calculated next service time for the flow queue.

If there are not enough frames in the flow queue, the flow queue will not be re-inserted in a scheduler unit according to the following rules:

A flow queue will be disconnected from the involved scheduler unit at service time if it becomes empty after the service cycle. If the flow queue has a guaranteed rate element, the available bandwidth of the VLAN, logical and port to which this flow queue belongs will be updated.

A flow queue will be disconnected from the square calendar at service time if it only contains one frame after the service cycle and if it is also connected to the circular calendar.

A flow queue will be disconnected from the circular calendar at service time if it only contains one frame after the service cycle and if it is also connected to the triangular calendar.

A non-empty flow queue will never be disconnected from a circular calendar if it is connected to a square calendar, for no guarantee on a service cycle is given by the square calendar.

A flow queue may only remain connected to a square calendar as long as the peak rate is not exceeded.

The following general rule also applies:

If the TP queue exceeds a predefined threshold, the square calendar will not be served.

Dequeue

Upon a frame having been dequeued from the flow queue, the scheduler shall provide a dequeue request to the network processor system such that the frame can be enqueued to the TPQ associated with the physical port. The scheduler shall provide a TPQ enqueue request that includes TPQ ID, FCB address, byte count, frame and type.

Mathematical Calculations

Scheduling Units

The mathematical calculations in the scheduler are related to the computation of service "distance" for the flow queues and VLANs, as well as logical links based on the service parameters of the flow queues, VLANs and the logical links. At each service time, the calendar "distance" calculations must be performed in order to determine the next time the flow queue, VLAN, or logical link currently under service will be served again by the scheduling unit.

Mathematical Calculation for Flow Control

The mathematical calculation for flow control computes the discard probability of an enqueuing frame if the threshold of the flow queue has been exceeded. Flow control (whether to forward or discard frames) in the network processor is provided by hardware assist mechanisms and pico code that implement a selected flow control algorithm. In general, flow control algorithms require information about the congestion state of the data flow, including the rate at which packets arrive, the current status of the data store, the current status of target blades, etc. A discard probability for various flows is computed based on the algorithms described in U.S. Pat. No. 6,657,962 owned by the assignee of the present invention. The implementation of flow control in the scheduler shall work as follows:

Flow control is invoked when the frame is enqueued to a flow queue. The hardware assist mechanisms use the discard probability along with tail drop congestion indicators to determine if a forwarding or discard action should be taken during frame enqueue operation. The flow control hardware uses the pico code's entries in the egress transmit probability memory to determine what flow control actions are required.

Network Management Counters Update

The network management counters are used to keep track of the statistics that occurs at each enqueue of a frame as the management information base for network traffic management. The network management counters are stored in DRAM 1 memory. The DRAM 1 memory module contains four memory banks denoted as banks A, B, C, and D. The network management counters belonging to the same category will be stored in the same memory bank.

It is noted that the accesses to the counters shall be allocated by the DRAM 1 memory arbiter. If the memory access request queues are overflowed when a scheduler component posts the access request, the posting request will be delayed and a small counter in the control block associated with the scheduler component shall continue the count and re-post the request at a later time.

Scheduler Functional Units

Figure 4:
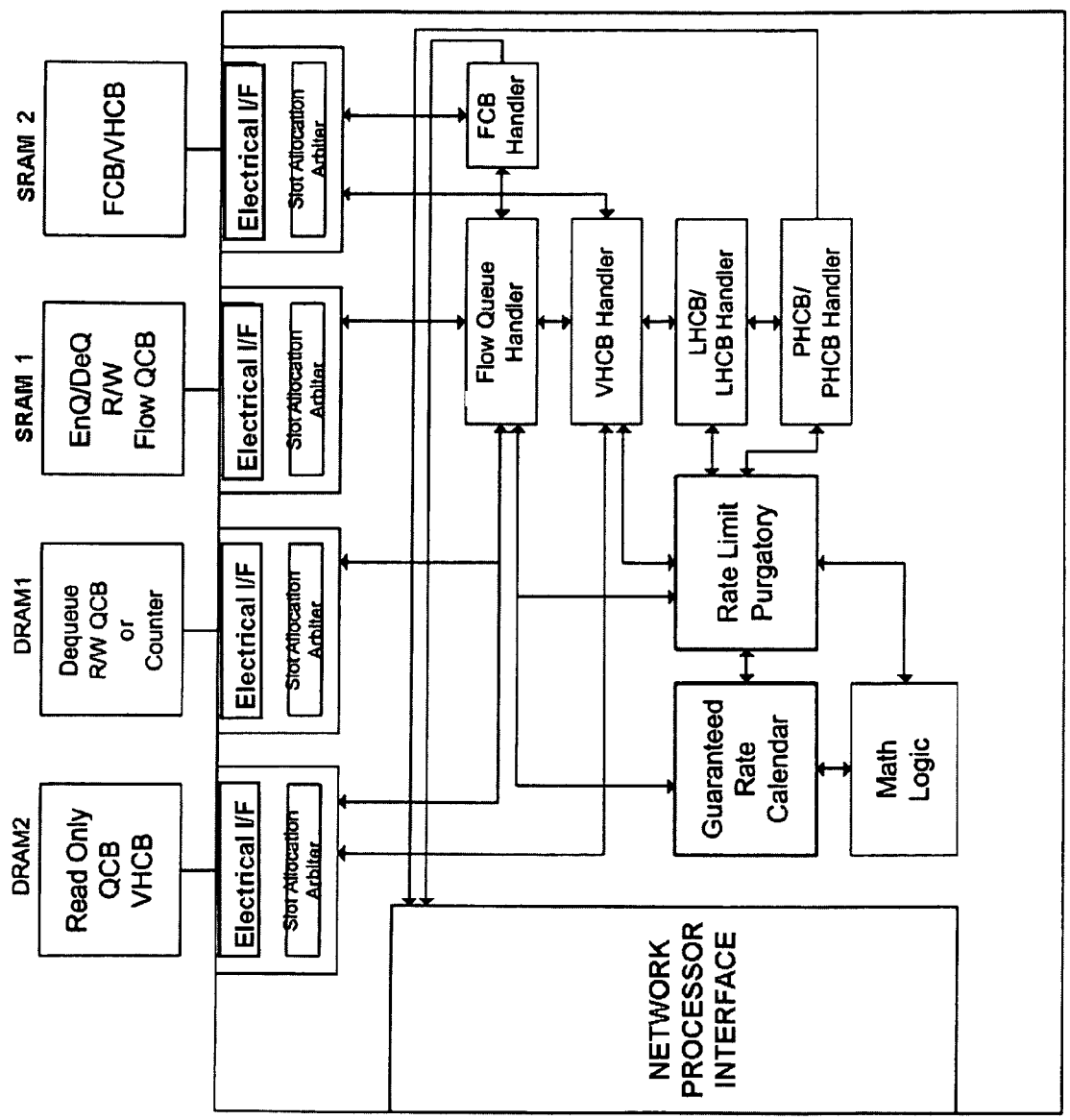
FIG. 4 is a functional block diagram of the scheduler of FIG. 1.

The main functional blocks of the scheduler 30 are shown in FIG. 4 and are summarized as follows:

Memory interfaces—The memory interface provides the connectivity to the memory devices for storing the control blocks. The interfaces include electrical interfaces 78 as well as memory arbiters 80 to provide arbitration for memory accesses.

Network processor system and scheduler chip-to-chip interface—This functional block 56 provides a means for the communication between the network processor system chip and the scheduler chip.

Guaranteed rate calendar—This functional block 60 provides the scheduling and shaping function for flow queues with minimum guaranteed service requirement. This is also noted as circular calendar.

Rate limit purgatory—This functional block 62 provides the rate limit function for flow queues, VLANs, as well as logical links such that these flow queues, VLANs and logical links can be limited by the peak service rate.

Math Logic—This block 64 provides the function for computing the scheduling time as well as determining the transmit probability of frames for flow control.

Scheduling pipeline—This pipeline contains the following sub-blocks:

Flow Queue handler 66
VLAN handler 68
LHCB and LHCB handler 70
PHCB and PHCB handler 72
TPQCB and TPQCB handler (not shown), and
FCB handlers 76

The combination of these blocks provides the function for controlling the accesses of both internal and external memory resources. This pipeline shall also control the operation of external memory arbiters for different types of external memory devices. The external memory resources are shown as SRAM 1 (32), SRAM 2 (34), DRAM 1 (36), and DRAM 2 (38).

Memory Interfaces

Two types of memory devices are used in the design of the scheduler, namely DRAM and SRAM memories. In general, DRAM memories are used for storing control blocks that are accessed less frequently within a fixed period of time while SRAM memories are used to store control blocks that are accessed with higher frequency within a fixed period of time. The functions of the memory interfaces are to provide arbitrations among memory access demands of the function blocks in the scheduler in conjunction with the scheduling pipeline, as well as electrical interfaces for the scheduler to connect the physical memory devices. The interfaces connect to four different sets of memory modules according to the following.

DRAM 1 Memory Interface

DRAM 1 memory is used to store the network management counters. The DRAM 1 memory contains four memory banks denoted as banks A, B, C and D. Each access to the counter by the scheduler requires a Read-Modify-Write to the counter memory. Hence, each memory 'read' request is accompanied by a memory 'write' request. In addition, the network management software executed by the NPC shall also require accesses to the content of the counters in a larger time scale. In this case, only memory 'read' requests are required. The 'read' access required by the network management software shall have absolute priority over the access requests posted by the scheduler.

At frame enqueue time, the scheduler determines the action on the enqueuing frame and posts the update to the counter memory request queues associated with each memory bank depending on the counters needed to be updated. The Read-Modify-Write request shall also contain the data to be written to the counter. The data usually includes the increments to the counter value. The arbiter groups 4 Read-Modify-Write accesses to four memory banks at each time and perform Read-Modify-Write in 18 memory cycles to optimize the memory access bandwidth. If the threshold of a request queue has been exceeded when the scheduler posts the access request to that particular request, the request cannot enter the queue and the incremental count will be retained in the control block. Otherwise, the request will enter the request queue and the incremental count in the control block will be reset.

DRAM 2 Memory Interface

DRAM 2 memory is used to store the control blocks associated with flow queues or VLANs that are read at each enqueue and dequeue time. Similar to DRAM 1 memory, there are four memory banks, A-D, in the DRAM 2 memory module. Although DRAM 2 is used to store 'read-only' control blocks, there are memory 'write' access required at a large time scale such that the traffic control profiles of the flow queues and VLANs can be updated when needed. It should be noted that, in this case, the 'write' requests have absolute priority over the 'read' requests.

The design of the memory arbiter shall be similar to the DRAM 1 memory arbiter with memory access request queues associated with the memory banks, although the content of these queues is different.

SRAM 1 Memory Interface

SRAM 1 memory is used to store Flow Queue Control Blocks (FQCBs) that are required to be read-and-write at enqueue or dequeue time. Because SRAM 1 memory is an SRAM device, there is no bank collision as in the DRAM to be considered. Hence, read-and-write access of an entry in SRAM 1 can be completed in one memory cycle. Since it is preferred that each FQCB contains three 72-bits words, each access of FQCB takes three memory cycles. In addition, because the FQCBs are accessed at enqueue and dequeue of frames, the design of the memory arbiter should consider the memory access allocation of SRAM 1 memory in six memory cycles.

SRAM 2 Memory Interface

SRAM 2 memory is used to store FCBs as well as VHCBs that require to be read-and-write at each enqueue and dequeue time. As with the SRAM 1 memory, the SRAM 2 memory is also an SRAM device such that there is no bank collision to be considered while designing the SRAM 2 memory arbiter. In SRAM 2 memory, Read-Modify-Write access can be completed in one memory cycle. Since an FCB preferably contains one word in the SRAM 2 memory, each access of FCB should be completed in one memory cycle. In VHCBs, two words typically are needed at enqueue time and three words are needed at dequeue time. Therefore, the enqueue access of VHCB can be completed in two memory cycles and the dequeue VHCB access can be completed in three memory cycles. The memory access allocation of SRAM 2 memory shall also be controlled by the scheduler pipeline.

Network Processor System and Scheduler Interface

The network processor system and scheduler chip-to-chip interface is used to provide the connectivity function between the network processor system and scheduler chip. The physical interface is based on network processing forum streaming interface (NPF-SI). The interface allows information to be exchanged between the network processor system and scheduler such that the scheduler can perform frame scheduling function based on a request from the network processor system.

Scheduler Pipeline

The function of the scheduler pipeline is to provide a facility to oversee all the accesses to the external memory resources of the scheduler required by the scheduling tasks by allocating the memory access windows to different scheduling tasks (enqueue and dequeue of frames). The scheduler pipeline also controls the memory arbiter associated with each external memory such that memory contention can be avoided while scheduling tasks are being performed by the scheduler.

In general, there are several rules that are applied to the design of the scheduler pipeline. These include:

- The memory accesses required by enqueue and dequeue operations shall not conflict with each other. In other words, the memory access windows allocated to the enqueue tasks shall not interfere with the memory access windows allocated to the dequeue tasks.
- Among all the dequeue operations shown in FIGS. 6, 7 and 8, the circular calendar (FIG. 6) shall have absolute priority over the square calendars and triangular calendars (FIG. 7) while the triangular calendar (FIG. 8) only has priority over the square calendars. That is, the priorities for accessing the external memory resources among the three types of calendars (4 types if LLS is presented) are in the order of circular, triangular and square.
- The dequeue by the circular calendar can pre-empt the triangular and square calendars' dequeue operation pipeline by suspending the triangular and square dequeue operations. The triangular and square dequeue operations can only resume when there is no circular dequeue operations that have been started.
- The dequeue by the triangular calendar can pre-empt any square calendar dequeue operation pipeline by suspending the square dequeue operations. The square dequeue operations can only resume when there is no circular or triangular dequeue operations that have been started.

Enqueue Pipeline

Figure 5:
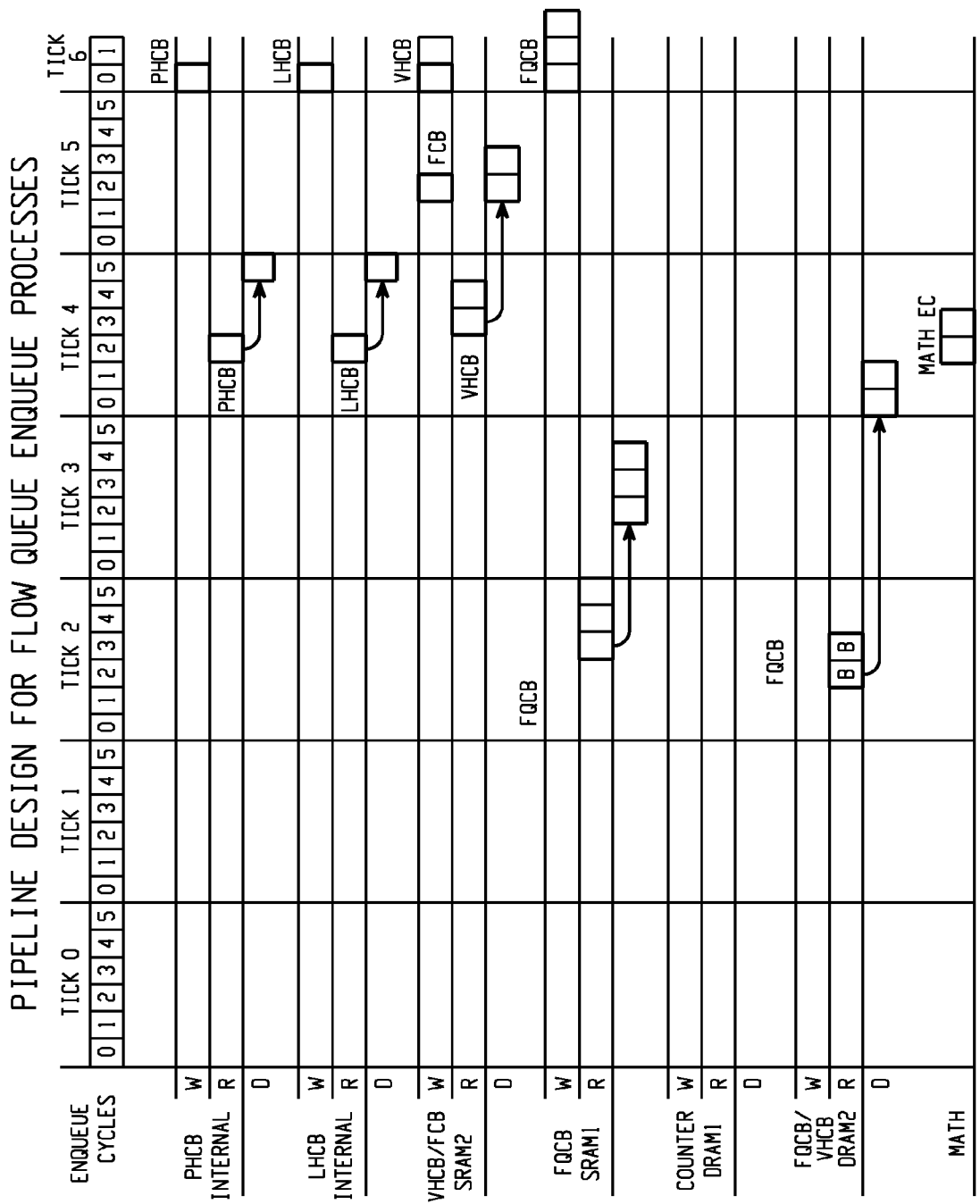
FIG. 5 shows a pipeline design for flow queue enqueue processing.

Upon receiving an enqueue request from the network processing system, the scheduler starts the enqueue operation by sending memory access requests to the memory arbiters of SRAM 1, SRAM 2, DRAM 1 and DRAM 2. The memory arbiters allocate the access slot for the enqueue operation as shown in FIG. 5. In the preferred embodiment, each tick shown in FIG. 5 represents 36 nanoseconds in time and each cycle within a tick represents six nanoseconds in time. The memory accesses of the enqueue operation start at tick 2, cycle 2. It is noted that tick 0 and tick 1 are reserved for memory accesses associated with dequeue operations initiated by the triangular calendar and square calendar. It is also noted that tick 0 to tick 5 represent an arbitrary period of six ticks and do not represent the absolute time of the system.

At tick 2, cycle 2, memory arbiter starts read access to FQCB stored in DRAM 2 by asserting a read command to the memory control bus. Because of the memory access latency, the data being read from DRAM 2 will not return from the memory until cycle 0 of tick 4. At tick 2, cycle 3, memory arbiter starts read access to FQCB in SRAM 1 by asserting a read command to the memory control bus. Again, because of the memory access latency, the data being read from SRAM 1 will not return from the memory until cycle 2 of tick 3. At tick 4, cycle 2, PHCB and LHCB residing in the internal memory of the scheduler will be accessed. The results for both accesses will not return from the memory until cycle 5 of tick 4. At tick 4, cycle 2, the math logic in the scheduler will start flow control mathematical computation with the data received from SRAM 1 and DRAM 2. At tick 4, cycle 3, memory arbiter starts read access of VHCB stored in SRAM 2 by asserting a read command to the memory control bus. The data to be read from SRAM 2 will not return from the memory until cycle 2 of tick 5 because of memory access latency. If the flow control mathematical computation has determined that the frame shall be enqueued to the flow queue, memory arbiter of SRAM 2 will be informed and the FCB associated with the enqueuing frame will be written to SRAM 2 at cycle 2 of tick 5. Finally, upon receiving all the read data from different memories, the scheduler will update PHCB to internal memory, update LHCB to internal memory, update VHCB to SRAM 2, and update FQCB to SRAM 1 at cycle 0 of tick 6. The enqueue operation associated with a frame is considered completed when all the memory write accesses has been completed at cycle 2 of tick 2.

Circular Calendar Initiated Dequeue Pipeline

Figure 6:
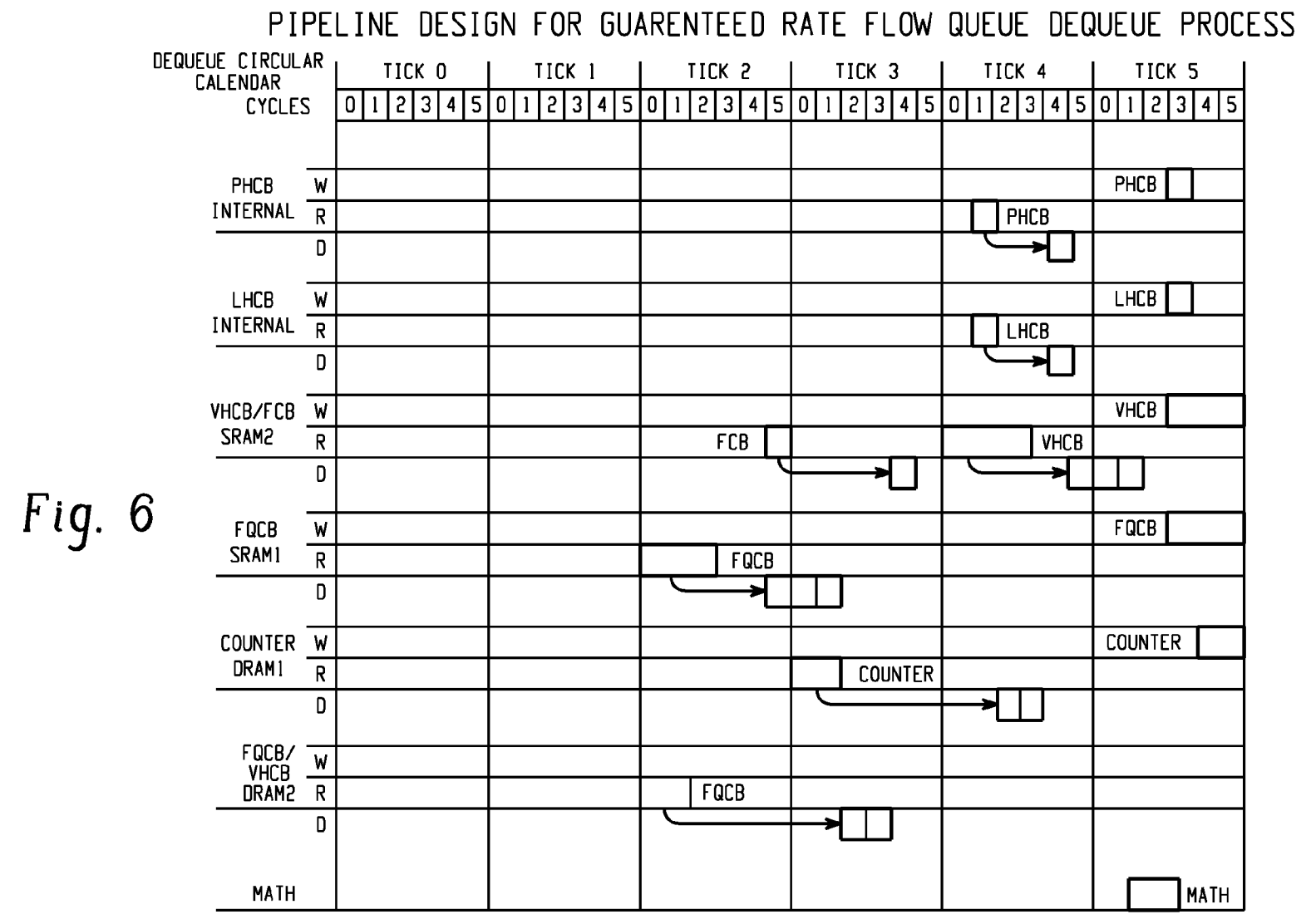

Once the circular calendar in the scheduler has selected a flow queue for frame transmission, the scheduler will start dequeue operation by sending memory access requests to the memory arbiters of SRAM 1, SRAM 2, DRAM 1 and DRAM 2. The memory arbiters allocate the access slot for the dequeue operation as shown in FIG. 6. In the preferred embodiment, each tick shown in FIG. 6 represents 36 nanoseconds in time and each cycle within a tick represents 6 nanoseconds in time. The memory accesses of the dequeue operation start at tick 2, cycle 0. It is noted that tick 0 and tick 1 are reserved for memory accesses associated with dequeue operations initiated by triangular calendar and square calendar. It is also noted that tick 0 to tick 5 represent an arbitrary period of 6 ticks and do not represent the absolute time of the system.

At tick 2, cycle 0, memory arbiter starts read access to FQCB stored in SRAM 1 by asserting a read command to the memory control bus. Because of the memory access latency, the data being read from SRAM 1 will not return from the memory until cycle 5 of tick 2. At the same cycle (tick 2, cycle 0), memory arbiter also starts read access to FQCB in bank A of DRAM 2 by asserting a read command to the memory control bus. Again, because of the memory access latency, the data being read from DRAM 2 will not return from the memory until cycle 2 of tick 3. At cycle 5 of tick 2, memory arbiter will start read access to FCB in SRAM 2 by asserting a read command to SRAM 2 control bus. The FCB being read from SRAM 2 will not return until cycle 4 of tick 3. At tick 3, cycle 0, memory arbiter will start read access to the counter stored in DRAM 1 by asserting a read command to DRAM 1 control bus. Again, the counter data being read from DRAM 1 will not return until cycle 2 of tick 4. At cycle 0 of tick 4, memory arbiter will start read access to VHCB stored in SRAM 2. The read data from SRAM 2 will not return from SRAM 2 until cycle 5 of tick 4. At tick 4, cycle 1, PHCB and LHCB resides in internal memory of the scheduler will be accessed by the scheduler. The results for both accesses will not return from the memory until cycle 4 of tick 4. At tick 5, cycle 1, the math logic in the scheduler will start scheduling and traffic shaping mathematical computation with the data received from SRAM 1, SRAM 2, DRAM 1 and DRAM 2. Finally, once the mathematical computation has been completed, the scheduler will start updating the control blocks by sending write access requests to the memory arbiters of SRAM 1, SRAM 2, and DRAM 1. PHCB and LHCB will be updated to internal memory at cycle 3 of tick 5. VHCB in SRAM 2 will be updated at cycle 3 of tick 5. FQCB in SRAM 1 will be updated at cycle 3 of tick 5. Then the counter in DRAM 1 will be updated at cycle 4 of tick 5. The dequeue operation will be considered completed at cycle 5 of tick 5 once all the memory write accesses associated with this dequeue operation have been completed.

Square Calendar Initiated Dequeue Pipeline

Figure 7:
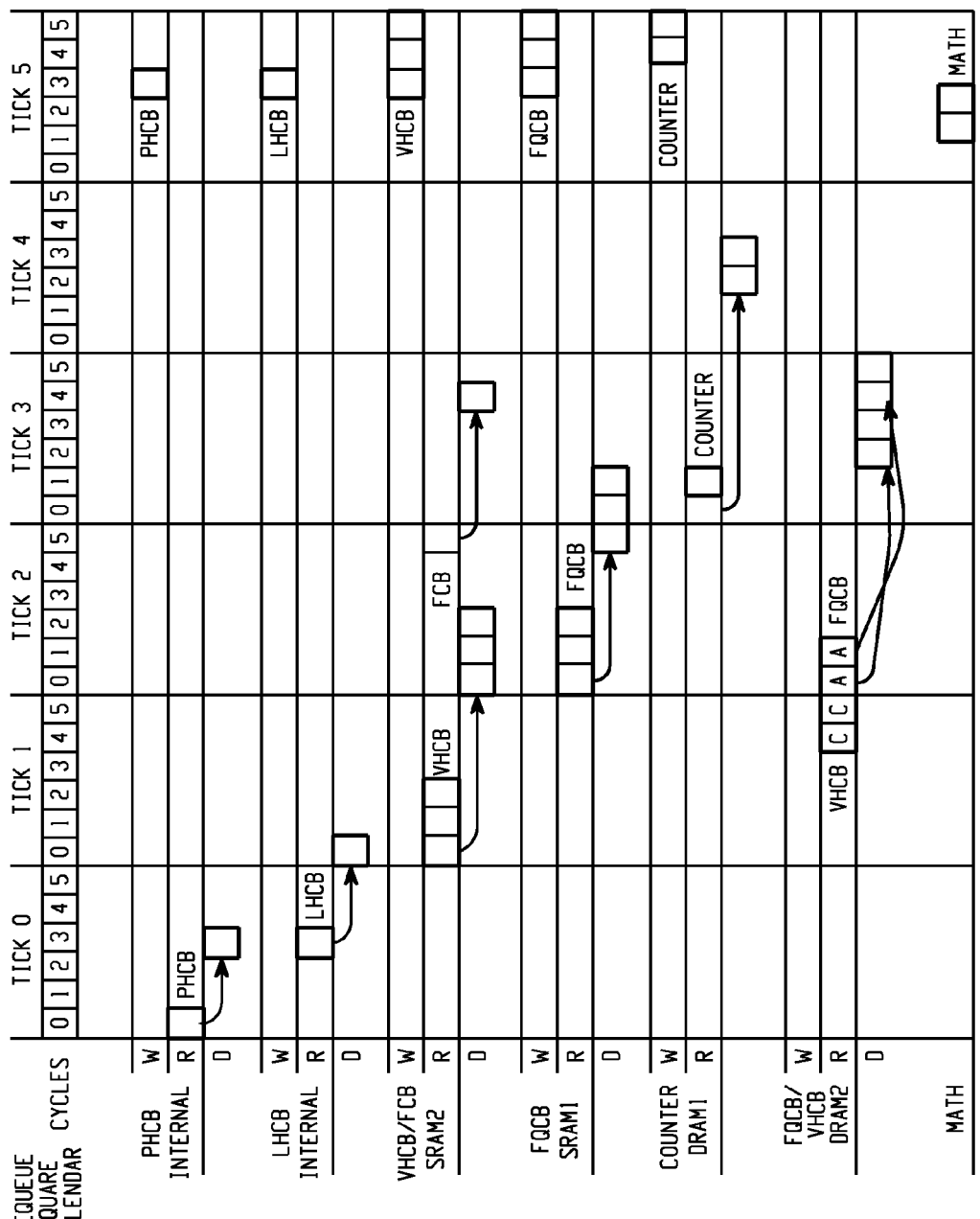
FIG. 7 represents a pipeline design for best-effort services flow queue dequeue processes.

Once the square calendar in the scheduler has selected a flow queue for frame transmission, the scheduler will start dequeue operation by sending memory access requests to the memory arbiters of SRAM 1, SRAM 2, DRAM 1 and DRAM 2. The memory arbiters allocate the access slot for the dequeue operation as shown in FIG. 7. In the preferred embodiment, each tick shown in FIG. 7 represents 36 nanoseconds in time and each cycle within a tick represents six nanoseconds in time. The memory accesses of the dequeue operation start at tick 0, cycle 0. Again, it is noted that tick 0 to tick 5 represent an arbitrary period of six ticks and do not represent the absolute time of the system.

At tick 0, cycle 0, scheduler starts read access to PHCB in the internal memory. The PHCB being read from the internal memory will not return until cycle 3 of tick 0. Then at cycle 3 of tick 0, scheduler starts read access to LHCB in internal memory, the LHCB being read from the memory will not return until cycle 0 of tick 1. At cycle 0 of tick 1, memory arbiter also starts read access to VHCB in SRAM 2 by asserting a read command to the memory control bus. Because of the memory access latency, the data being read from SRAM 2 will not return from the memory until cycle 0 of tick 2. At tick 2, cycle 4, memory arbiter also starts read access to VHCB in bank C of DRAM 2 by asserting a read command to the memory control bus. Again, because of the memory access latency, the data being read from DRAM 2 will not return from the memory until cycle 2 of tick 3. At cycle 0 of tick 2, memory arbiter will start read access to FQCB in SRAM 1 by asserting a read command to SRAM 1 control bus. The FQCB being read from SRAM 1 will not return until cycle 5 of tick 2. At the same time (tick 2, cycle 0), memory arbiter will also start read access to FQCB stored in bank A of DRAM 2 by asserting a read command to DRAM 2 control bus. Again, the FQCB data being read from DRAM 2 will not return until cycle 4 of tick 3. At cycle 5 of tick 3, memory arbiter will start read access to CCB stored in SRAM 2. The read data from SRAM 2 will not return from SRAM 2 until cycle 4 of tick 3. At tick 3, cycle 0, memory arbiter will start read access to counter stored in DRAM 1. The results for this access will not return from the memory until cycle 2 of tick 4. At tick 5, cycle 1, the math logic in the scheduler will start scheduling the traffic shaping mathematical computation with the data received from SRAM 1, SRAM 2, and DRAM 1 and DRAM 2. Finally, once the mathematical computation has been completed, the scheduler will start updating the control blocks by sending write access requests to the memory arbiters of SRAM 1 and SRAM 2. PHCB and LHCB will be updated to internal memory at cycle 3 of tick 5. VHCB in SRAM 2 will be updated at cycle 3 of tick 5. FQCB in SRAM 1 will be updated at cycle 3 of tick 5. Then counter in DRAM 1 will be updated at cycle 4 of tick 5. The dequeue operation will be considered completed at cycle 5 of tick 5 once all the memory write accesses associated with this dequeue operation have been completed.

Triangular Calendar Initiated Dequeue Pipeline

Figure 8:
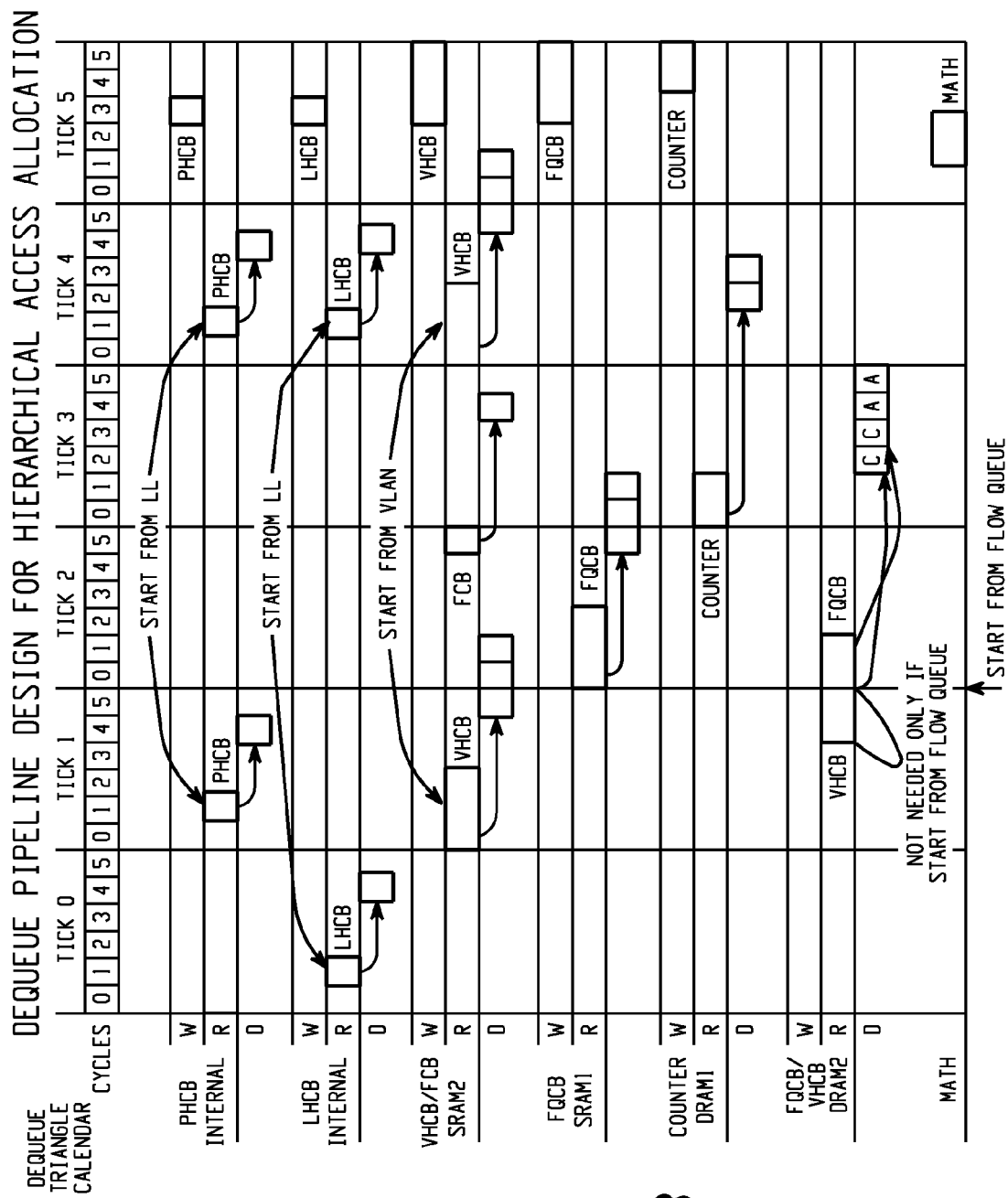
FIG. 8 is a dequeue pipeline design for hierarchical access allocation.

Once the triangular calendar in the scheduler has selected a flow queue for frame transmission, the scheduler will start dequeue operation by sending memory access requests to the memory arbiters of SRAM 1, SRAM 2, DRAM 1 and DRAM 2. The memory arbiters allocate the access slot for the dequeue operation as shown in FIG. 8. In the preferred embodiment, each tick represents 36 nanoseconds in time and each cycle within a tick represents six nanoseconds in time. The memory accesses of the dequeue operation start at tick 0, cycle 1, if the dequeue operation is initiated at the logical link level. If the dequeue operation is initiated at VLAN level, memory accesses of the dequeue operation start at cycle 0 of tick 1. Finally, if the dequeue operation is initiated at flow queue level, memory accesses will start at cycle 4 of tick 1. Again, it is noted that tick 0 to tick 5 represent an arbitrary period of six ticks and do not represent the absolute time of the system.

In the case of dequeue operation initiated at flow queue level, at tick 1, cycle 4, memory arbiter starts read access to VHCB in bank C of DRAM 2. The VHCB being read from the internal memory will not return until cycle 0 of tick 3. Then at cycle 0 of tick 2, the memory arbiter starts read access to FQCB in SRAM 1 and FQCB in bank A of DRAM 2. The FQCB being read from the memories will not return until cycle 5 of tick 2 and cycle 2 of tick 3, respectively. Then at cycle 5 of tick 2, the memory arbiter also starts read access to FCB in SRAM 2 by asserting a read command to the memory control bus. Because of the memory access latency, the data being read from SRAM 2 will not return from the memory until cycle 4 of tick 3. At tick 3, cycle 0, memory arbiter will start read access to counter in DRAM 1. The data being read from DRAM 1 will not return until cycle 2 of tick 4. At tick 4, cycle 0, the memory arbiter starts read access to VHCB in SRAM 2 by asserting a read command to the memory control bus. Again, because of the memory access latency, the data being read from SRAM 2 will not return from the memory until cycle 5 of tick 4. At cycle 1 of tick 4, the scheduler will start read access to PHCB and LHCB in internal memory. The PHCB and LHCB being read from internal memory will not return until cycle 4 of tick 4. At tick 5, cycle 1, the math logic in the scheduler will start scheduling and the traffic shaping mathematical computation with the data received from SRAM 1, SRAM 2, DRAM 1 and DRAM 2. Finally, once the mathematical computation has been completed, scheduler will start updating the control blocks by sending write access requests to the memory arbiters of SRAM 1 and SRAM 2. PHCB and LHCB will be updated to internal memory at cycle 3 of tick 5. VHCB in SRAM 2 will be updated at cycle 3 of tick 5. FQCB in SRAM 1 will be updated at cycle 3 of tick 5. Then counter in DRAM 1 will be updated at cycle 4 of tick 5. The dequeue operation will be considered completed at cycle 5 of tick 5, once all the memory write accesses associated with this dequeue operation have been completed.

In the cases of dequeue operation initiated at logical link level or VLAN level, the memory accesses will start as indicated by the arrows in FIG. 8 and will not be described in further detail.

Each functional queue control block content typically is configured at power-on or during run time. Accordingly programmers should be aware of the arrangement of data structure.

Figure 9:
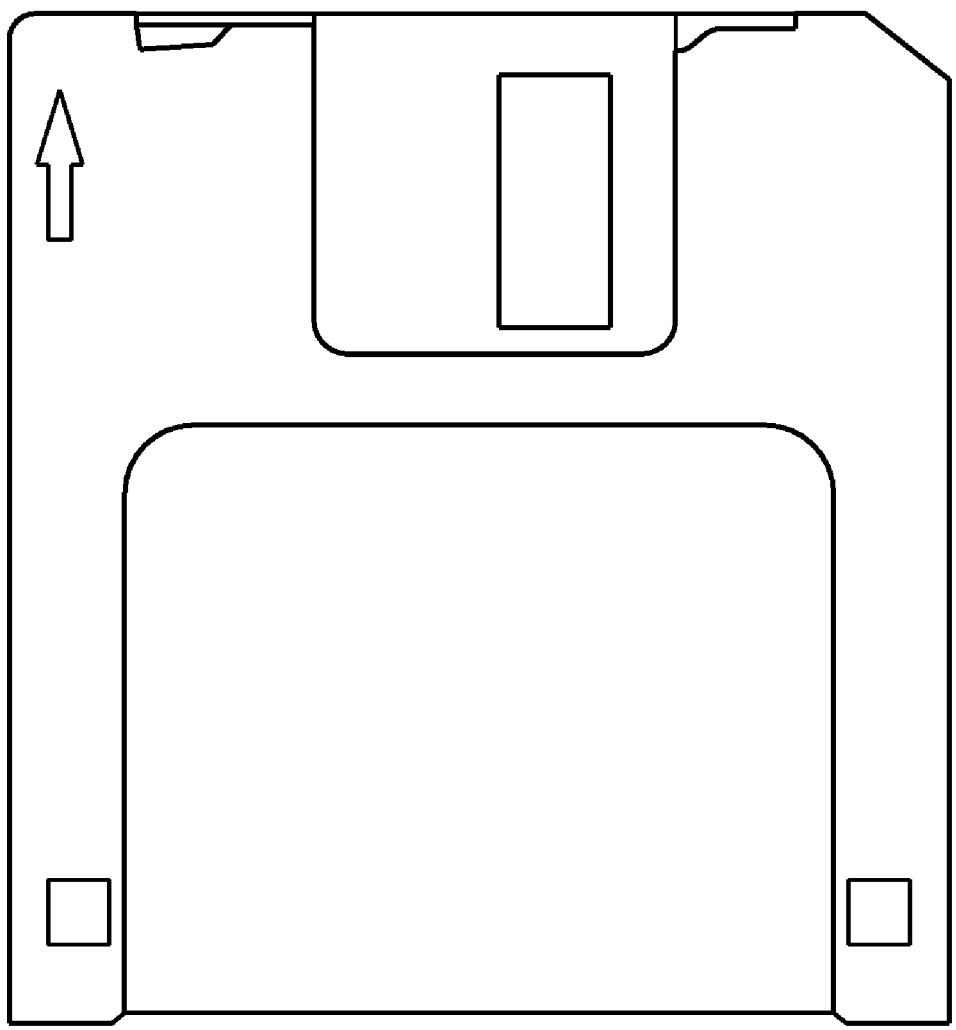
FIG. 9 is a representation of a computer readable medium useful in connection with this invention.

FIG. 9 shows a computer-readable medium in the form of a floppy disc 900 for containing the software implementation of the program to carry out the various steps of project management according to the present invention. Other machine readable storage mediums are fixed hard drives, optical discs, magnetic tapes, semiconductor memories, such as read-only memories (ROMs), programmable (PROMs), etc. The article containing this computer readable code is utilized by executing the code directly from the storage device, or by copying the code from one storage device to another storage device, or by transmitting the code on a network for remote execution. The computer program may be loaded into the memory to configure and to run the scheduler 20 of FIG. 1 for execution. The computer program comprises instructions which, when read and executed by the scheduler 20, perform the steps necessary to execute the steps or elements of the present invention.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What is claimed is:

1. A method for scheduling traffic information in a network on a per-port hierarchical sharing basis, the method comprising:
   distributing a total bandwidth of a physical port into a hierarchical tree comprising a plurality of logical links that each depend from the physical port, a plurality of virtual local area network queues that each depend from the logical links, and a plurality of flow queues that each depend from the virtual local area network queues through either a guaranteed data flow link or a best effort flow link; and
   enqueuing and dequeueing a frame by:
   storing parts of flow queue control blocks that are required to be read and written at an enqueue instance of the frame and at a dequeue instance of the frame in a static random access memory via a first static random access memory interface comprising a first interface read bus dedicated for read access and a first interface write bus dedicated to write access;
   storing hierarchy control blocks of the virtual local area network queues and frame control blocks that are required to be read and written at the enqueue instance and the dequeue instance in the static random access memory via a second static random access memory interface that is different from the first static random access memory interface and comprising a second interface read bus dedicated for read access and a second interface write bus dedicated to write access;

updating a network management read-write-modify counter in a first dynamic random access memory in response to the enqueue instance;

storing parts of read-only flow queue control blocks and read-only virtual local area network queue hierarchy control blocks that are required to be read and written at the enqueue instance and the dequeue instance in a second dynamic random access memory; and dequeuing the frame from the flow queues as a function of a value of the network management read-write-modify counter.

2. The method of claim 1, wherein each of the flow queue control blocks of the flow queues is associated with a queue weight, the method further comprising:

distributing bandwidth available to each of the virtual local area network queues to the flow queues assigned to the virtual local area network queues in proportion to their relative queue weights.

3. The method of claim 2, wherein the dequeuing the frame from the flow queues as the function of the value of the network management read-write-modify counter comprises moving the frame from an associated flow queue of the plurality of flow queues to a target port queue when the updated network management read-write-modify counter has an accumulated credit count greater than or equal to a length of the frame in a head of the flow queue associated with the frame.

4. The method of claim 3, wherein the dequeuing the frame from the flow queues as the function of the value of the network management read-write-modify counter further comprises moving the frame to the target port queue when the updated network management read-write-modify counter has an accumulated credit count less than the length of the frame in the head of the flow queue associated with the frame if the associated flow queue is being emptied by the guaranteed data flow link or the best effort flow link.

5. A system for scheduling traffic information in a network on a per-port hierarchical sharing basis, the system comprising:

a scheduler in communication with a network processor chip via a network processor forum compliant interface, the scheduler comprising a hierarchical tree that distributes a total bandwidth of a physical port into a plurality of logical links that each depend from the physical port, a plurality of virtual local area network queues that each depend from the logical links, and a plurality of flow queues that each depend from the virtual local area network queues through either a guaranteed data flow link or a best effort flow data link;

a static random access memory in communication with the scheduler through first and second interfaces, each comprising a bus dedicated for read access and a bus dedicated to write access, wherein the scheduler uses the first static random access memory interface to store parts of flow queue control blocks that are required to be read and written at enqueue and dequeue instances of the flow queues, and the second static random access memory interface to store hierarchy control blocks of the virtual local area network queues and frame control blocks that are required to be read and written at enqueue and dequeue instances;

a first dynamic random access memory in communication with the scheduler and comprising a network management read-write-modify counter, wherein the scheduler updates the network management read-write-modify counter in response to the enqueue instance; and a second dynamic random access memory in communication with the scheduler, wherein the scheduler stores parts of read-only flow queue control blocks and read-only virtual local area network queue hierarchy control blocks that are required to be read and written at the enqueue instance and the dequeue instance; and wherein the scheduler dequeues the frame from the flow queues as a function of a value of the network management read-write-modify counter.

6. The system of claim 5, wherein each of the flow queue control blocks of the flow queues is associated with a queue weight; and wherein hierarchical tree distributes bandwidth available to each of the virtual local area network queues to the flow queues assigned to the virtual local area network queues in proportion to their relative queue weights.

7. The system of claim 6, wherein the scheduler dequeues the frame from the flow queues as the function of the value of the network management read-write-modify counter by moving the frame from an associated flow queue of the plurality of flow queues to a target port queue when the updated network management read-write-modify counter has an accumulated credit count greater than or equal to a length of the frame in a head of the flow queue associated with the frame.

8. The system of claim 7, wherein the scheduler dequeues the frame from the flow queues as the function of the value of the network management read-write-modify counter by moving the frame to the target port queue when the updated network management read-write-modify counter has an accumulated credit count less than the length of the frame in the head of the flow queue associated with the frame if the associated flow queue is being emptied by the guaranteed data flow link or the best effort flow link.

9. A computer program product for scheduling traffic information in a network on a per-port hierarchical sharing basis, the computer program product comprising:

a non-transitory computer readable storage medium having computer readable program code embodied therewith, the computer readable program code comprising:

computer readable program code configured to distribute a total bandwidth of a physical port into a hierarchical tree comprising a plurality of logical links that each depend from the physical port, a plurality of virtual local area network queues that each depend from the logical links, and a plurality of flow queues that each depend from the virtual local area network queues through either a guaranteed data flow link or a best effort flow link;

store parts of flow queue control blocks that are required to be read and written at an enqueue instance of a frame and at a dequeue instance of the frame in a static random access memory via a first static random access memory interface;

store hierarchy control blocks of the virtual local area network queues and frame control blocks that are required to be read and written at the enqueue instance and the dequeue instance in the static random access memory via a second static random access memory interface;

update a network management read-write-modify counter in a first dynamic random access memory in response to the enqueue instance;

store parts of read-only flow queue control blocks and read-only virtual local area network queue hierarchy control blocks that are required to be read and written at the enqueue instance and the dequeue instance in a second dynamic random access memory; and dequeue the frame from the flow queues as a function of a value of the network management read-write-modify counter.

10. The computer program product of claim 9, wherein each of the flow queue control blocks of the flow queues is associated with a queue weight; and wherein the computer readable program code is further configured to distribute bandwidth available to each of the virtual local area network queues to the flow queues assigned to the virtual local area network queues in proportion to their relative queue weights.

11. The computer program product of claim 10, wherein the computer readable program code is further configured to dequeue the frame from the flow queues as the function of the value of the network management read-write-modify counter by moving the frame from an associated flow queue of the plurality of flow queues to a target port queue when the updated network management read-write-modify counter has an accumulated credit count greater than or equal to a length of the frame in a head of the flow queue associated with the frame.

12. The computer program product of claim 11, wherein the computer readable program code is further configured to dequeue the frame from the flow queues as the function of the value of the network management read-write-modify counter by moving the frame to the target port queue when the updated network management read-write-modify counter has an accumulated credit count less than the length of the frame in the head of the flow queue associated with the frame if the associated flow queue is being emptied by the guaranteed data flow link or the best effort flow link.

\* \* \* \* \*